US012404027B2

(12) United States Patent
Song (10) Patent No.: US 12,404,027 B2
(45) Date of Patent: Sep. 2, 2025

(54) COLLISION LOAD DISTRIBUTION STRUCTURE OF FUSELAGE

(71) Applicants: Hyundai Motor Company, Seoul (KR); Kia Corporation, Seoul (KR)

(72) Inventor: Won Ki Song, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 250 days.

(21) Appl. No.: 18/224,283

(22) Filed: Jul. 20, 2023

(65) Prior Publication Data

US 2024/0166354 A1    May 23, 2024

(30) Foreign Application Priority Data

Nov. 21, 2022    (KR) .................. 10-2022-0155970

(51) Int. Cl.
*B64D 11/06* (2006.01)
*B64C 1/06* (2006.01)

(52) U.S. Cl.
CPC .......... *B64D 11/0619* (2014.12); *B64C 1/062* (2013.01)

(58) Field of Classification Search
CPC ...... B64D 11/0619; B64D 25/04; B64C 1/062
See application file for complete search history.

(56) References Cited

U.S. PATENT DOCUMENTS

| 3,314,720 | A | * | 4/1967 | Millington | B64D 11/0698 |
| | | | | | 297/483 |
| 4,718,719 | A | | 1/1988 | Brennan | |
| 9,617,013 | B2 | * | 4/2017 | Mairou | B64C 27/04 |
| 9,969,307 | B1 | * | 5/2018 | Bosen | B64D 11/0619 |
| 11,787,554 | B2 | * | 10/2023 | Regnier | B64D 27/31 |
| | | | | | 244/135 R |
| 11,794,611 | B2 | * | 10/2023 | Setterberg | B60N 2/12 |
| 11,993,360 | B2 | * | 5/2024 | Groninga | B64C 1/062 |

FOREIGN PATENT DOCUMENTS

| JP | 2019-137122 A | 8/2019 |
| KR | 10-2020-0061153 A | 6/2020 |
| KR | 102153029 B1 | 9/2020 |
| KR | 10-2022-0069377 A | 5/2022 |

\* cited by examiner

*Primary Examiner* — Peter M Poon
*Assistant Examiner* — Marisa V Conlon
(74) *Attorney, Agent, or Firm* — Banner & Witcoff, Ltd.

(57) ABSTRACT

Proposed is a collision load distribution structure of a fuselage, wherein the structure includes a support unit positioned between a front unit and a rear unit of the fuselage and configured to allow a collision load of the fuselage to be transferred by being connected to the front unit and the rear unit, a wing unit positioned at the inside of the support unit and connected to the support unit to transfer the collision load of the fuselage, and a seat unit coupled to a connection frame mounted in a second-row passenger space of a floor frame constituting the front unit and fastened to a first rear frame extending in a height direction from the floor frame toward the support unit.

8 Claims, 11 Drawing Sheets

FIG. 13

COLLISION LOAD DISTRIBUTION STRUCTURE OF FUSELAGE

CROSS REFERENCE TO RELATED APPLICATION

The present application claims priority to Korean Patent Application No. 10-2022-0155970, filed Nov. 21, 2022, the entire contents of which is incorporated herein for all purposes by this reference.

FIELD

The present disclosure relates to a collision load distribution structure of a fuselage and, more particularly, to a collision load distribution structure of a fuselage capable of securing transverse rigidity and up-down vertical rigidity of the fuselage by utilizing a seat frame structure.

BACKGROUND

Urban Air Mobility (UAM) is being developed as an air traffic system to solve traffic congestion on roads. Urban air vehicles provide a means of transportation that may safely transport passengers to a designated place. They may be used at a lower cost as a helicopter since a separate runway is not required due to their capability of vertical take-off and landing. A pilot is not required due to the urban air vehicle's capability of autonomous driving.

Since occupants may be close to an inner surface (e.g., internal side surface) of the fuselage in urban air vehicles, technology to secure stability of the fuselage in an event of a collision is of paramount importance. Nevertheless, conventional urban air vehicles have a problem in that safety is not guaranteed because an impact load entering the space where the occupant is positioned is greatly transferred due to the impact applied to the fuselage during a collision.

The foregoing is intended merely to aid in the understanding of the background of the present disclosure and is not intended to mean that the present disclosure falls within the purview of the related art that is already known to those skilled in the art.

SUMMARY

The following summary presents a simplified summary of certain features. The summary is not an extensive overview and is not intended to identify key or critical elements.

Systems, apparatuses, and methods are described for a collision load distribution structure of a fuselage. The structure comprises a support unit positioned between a front unit and a rear unit of the fuselage and configured to allow a collision load of the fuselage to be transferred via connections to the front unit and the rear unit; a wing unit positioned at an inner side of the support unit and connected to the support unit so as to be configured to allow the collision load of the fuselage to be transferred; and a seat unit. The seat unit may be coupled to connection frames and fastened to a first rear frame. The connection frames may be mounted in a second-row passenger space of a floor frame of the front unit. The first rear frame may extend in a height direction from the floor frame toward the support unit.

Also, or alternatively, a collision load distribution structure of a fuselage may comprise a support unit positioned between a front unit and a rear unit of the fuselage and configured to allow a collision load of the fuselage to be transferred via connections to the front unit and the rear unit. The structure may further comprise a wing unit positioned at an inside of the support unit and connected to the support unit so as to be configured to transfer the collision load of the fuselage. The structure may further comprise a seat unit coupled to connection frames mounted in a second-row passenger space of a floor frame of the front unit and fastened to a first rear frame extending in a height direction from the floor frame toward the support unit. The seat unit may be connected to the first rear frame in a horizontal direction and coupled to the connection frames in a vertical direction, thereby being configured to reinforce transverse rigidity and vertical rigidity of the fuselage.

These and other features and advantages are described in greater detail below.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Hereinbelow, examples of the present disclosure will be described in detail with reference to the accompanying drawings.

Advantages and features of the present disclosure and a method of achieving same will become clear with reference to the examples described below in detail in conjunction with the accompanying drawings.

However, the present disclosure is not limited by the examples disclosed below, and may be implemented in a variety of different forms. The examples are provided to explain and inform, but not limit, the scope of the present disclosure to a person having common knowledge of the art to which the present disclosure pertains. The present disclosure is only defined by the scope of the claims.

In addition, in the description of the present disclosure, when it is determined that related known technologies may obfuscate the gist of the present disclosure, a detailed description thereof will be omitted.

Figure 1:
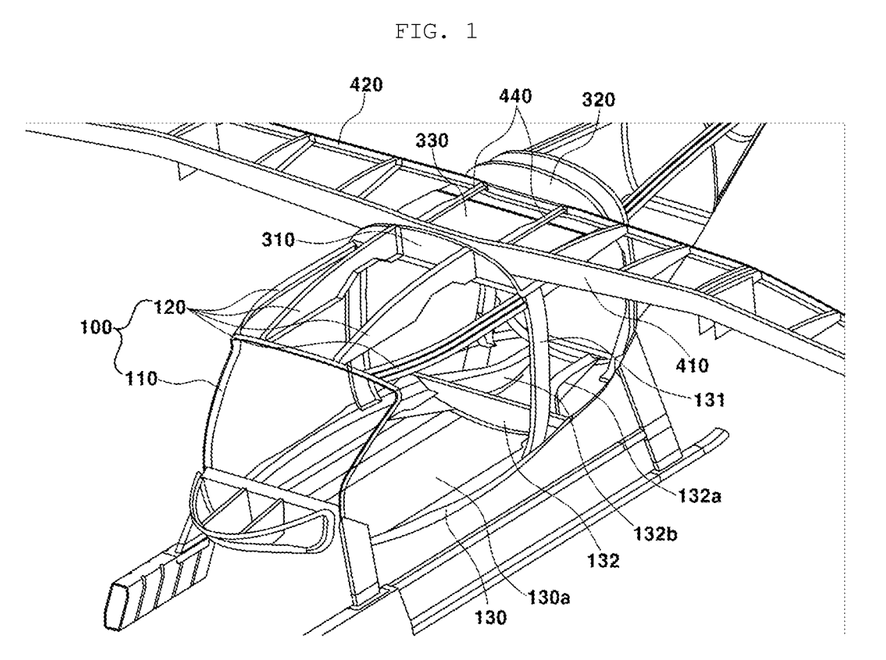
FIG. 1 is a view showing a collision load distribution structure of a fuselage according to an example of the present disclosure.
Figure 2:
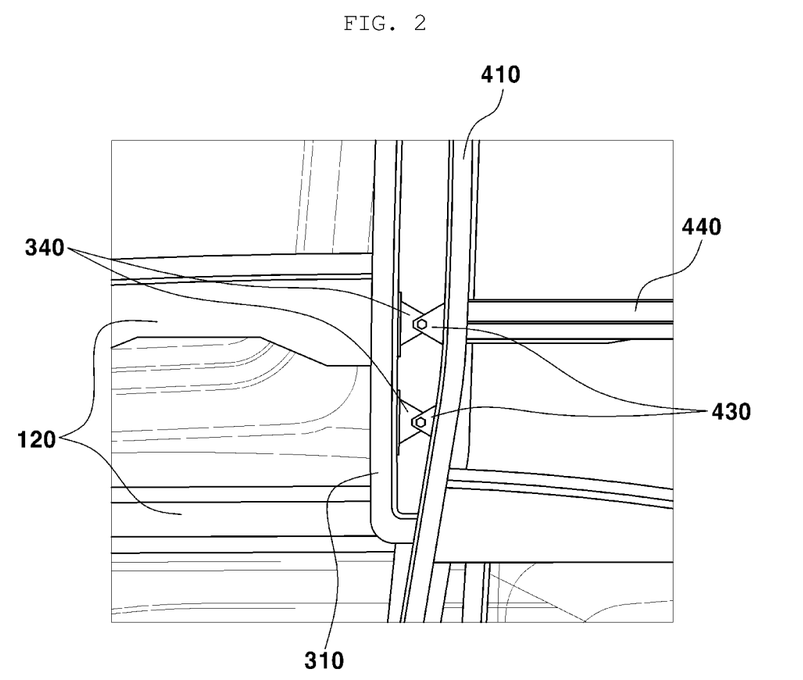
FIG. 2 is a view showing a fastening relationship between a support fitting member and a wing fitting member for the collision load distribution structure of a fuselage according to the example of the present disclosure.
Figure 3:
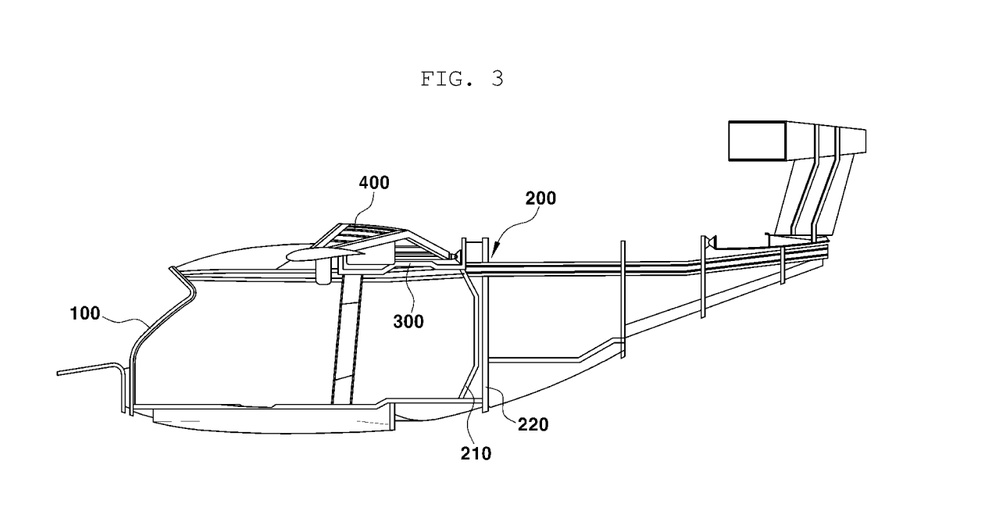
FIG. 3 is a view showing a rear unit for the collision load distribution structure of a fuselage according to the example of the present disclosure.

FIG. 1 is a view showing a collision load distribution structure of a fuselage according to an embodiment of the present disclosure, and FIG. 2 is a view showing a fastening relationship between a support fitting member and a wing fitting member for the collision load distribution structure of a fuselage according to the embodiment of the present disclosure, and FIG. 3 is a view showing a rear unit for the collision load distribution structure of a fuselage according to the example of the present disclosure.

With reference to FIGS. 1-3, the collision load distribution structure of a fuselage according to the embodiment of the present disclosure may include a support unit 300, which may be connected to a wing unit 400 positioned between a front unit 100 and a rear unit 200. The support unit 300 may be configured to distribute a load applied to the fuselage to the wing unit 400 and the rear unit 200 of the fuselage. More specifically, according to the present disclosure, the collision load distribution structure may be configured to reduce an impact load entering a space where occupants are by allowing a load in a longitudinal direction and a load in a height direction applied to the fuselage to be transferred through a connection structure of a front unit 100 and the support unit 300, a connection structure of the support unit 300 and the rear unit 200, and a connection structure of the support unit 300 and the wing unit 400.

The front unit 100 may be positioned at a front end of the fuselage with respect to the wing unit 400 of the fuselage. The front unit 100 may include a window frame 110 to which windshield glass may be mounted and a roof frame 120. The roof frame 120 may be connected to a rear end of the window frame 110 and may extend along a longitudinal direction of the fuselage. The window frame 110 may be a frame configured to surround the front windshield glass of the fuselage. As one example, as shown in FIG. 1, the four roof frames 120 may be provided, with two on a central part and two on sides in the width direction of the window frame 110. The roof frames 120 may be configured to have the same distance from each other. The floor frame 130 may constitute a fuselage floor 130a. The floor frame 130 may allow an inner space to be separated inside of the front unit 100. for example, the inner space inside the front unit 100 may be separated into a first-row passenger space on a front side of the inner space and a second-row passenger space on the rear side of the inner space. As one example, the inner space formed by the floor frame 130 may be divided into the first-row passenger space and the second-row passenger space with a rear bulkhead 132 as a boundary. Such a rear bulkhead 132 may include a pair of connection frames 132a and 132b thereon to be connected to a second rear frame 220 to be described later.

The support unit 300 may be positioned between the front unit 100 and the rear unit 200 (see, e.g., FIG. 3). The roof frame 120 may be configured to be connected to the support unit 300. Here, the rear end of the roof frame 120 may be configured to be connected to the front end of the support unit 300. The support unit 300 may be configured to be connected to the front unit 100 and the rear unit 200, so that a load applied to the front of the fuselage is distributed to the rear. More specifically, the support unit 300 may include a first flange portion 310 (e.g., a first flange), a second flange portion 320 (e.g., a second flange), a plate portion 330 (e.g., a plate), and support fitting members 340 (see, e.g., FIGS. 1-2).

The support unit 300 may be configured such that the first flange portion 310 and the second flange portion 320 face each other with the plate portion 330 as a reference (e.g., therebetween). The support unit 300 may form a space at an inner side thereof, e.g., with the roof frame 120 or the wing unit 400, the space having the first flange portion 310 and the second flange portion 320 facing each other and fastened, e.g., to the plate portion 330. The first flange portion 310 may be connected to the rear end of the roof frame 120. The rear end of the roof frame 120 may be fastened to a front outer surface of the first flange portion 310. The second flange portion 320 may be connected to the front end of the rear unit 200. The front end of the rear unit 200 may be fastened to the rear outer surface of the second flange portion 320.

The plate portion 330 may be provided between the first flange portion 310 and the second flange portion 320. In this case, the plate portion 330 may constitute a rear surface of a recessed area (e.g., recessed into the fuselage) between the first flange portion 310 and the second flange portion 320, which may be positioned on opposite sides of the plate portion 330 in the longitudinal direction. The plate portion 330 may be provided in a plate shape (e.g., substantially flat) and may be provided between lower ends of the first flange portion 310 and the second flange portion 320. The plate portion 330 may be configured to be connected to a member providing an external frame of the fuselage to transfer loads in the longitudinal direction and height direction of the fuselage.

The support fitting members 340 may be provided on opposite inner surfaces of an inner side of each of the first flange portion 310 and the second flange portion 320. As an example, one or more support fitting members 340 (e.g., two support members on a left and right side in the width direction) of an inner side of the first flange portion 310. In addition, one or more support fitting members 340 (e.g., two support members on a left and right sides in a width direction) of inner side surface of the second flange portion 320. A coupling portion may be provided on each of the first flange portion 310 and the second flange portion 320 at a position corresponding to the end of each of the support fitting members 340 provided thereon, so the support fitting members 340 may be coupled to the first flange portion 310 and the second flange portion 320 at the coupling portions, respectively.

The wing unit 400 may be positioned at the inner side of the support unit 300 (e.g., so as to form an inner space with the support unit 300). The wing unit 400 may be configured to be connected to the support unit 300 so that loads may be distributed along the wing unit 400, e.g., when a collision with the fuselage occurs. The wing unit 400 may include a first skeleton portion 410, a second skeleton portion 420, a wing fitting member 430, a wing frame portion 440, and a skin portion 450. The first skeleton portion 410 may be spaced apart at a predetermined interval from the inner side of the first flange portion 310 and provided to extend in the width direction of the fuselage. The second skeleton portion 420 may be spaced apart at a predetermined interval from the inner side of the second flange portion 320 and provided to extend in the width direction of the fuselage. The first skeleton portion 410 may constitute a transverse direction skeleton of the front end of the wing unit 400, and the second skeleton portion 420 may constitute a transverse direction skeleton of the rear end of the wing unit 400.

The wing fitting member 430 may be provided outside each of the first skeleton part 410 and the second skeleton part 420 at a position corresponding to the longitudinal direction of the support fitting member 340. Moreover, the outer side of the first skeleton portion 410, where the wing fitting members 430 are positioned may, refer to a direction in which the first skeleton portion 410 faces the first flange portion 310, and the outer side of the second skeleton portion 420, where the wing fitting members 430 are positioned, may refer to a direction in which the second skeleton portion 420 faces the second flange portion 320.

The wing fitting member 430 may be configured to be correspondingly connected to the support fitting member 340. As an example, one or more wing fitting members 430 may be provided (e.g., two on each of left and right side in the width direction) on the outer side surface of the first skeleton portion 410. In addition, one or more wing fitting members 430 may be provided (e.g., two on each of left and right side in the width direction) on the outer side surface of the second skeleton portion 420. Here, the wing fitting member 430 may have one end fixed to the outer side of each of the first skeleton portion 410 or the second skeleton portion 420 and an opposite end provided with a coupling portion. A coupling portion may be provided on each of the support fitting member 340 extending away from the first flange portion 310 or second flange portion to which the support fitting member 340 is connected. The coupling portion of the support fitting member 340 and the coupling portion of an aligned wing fitting member 430 may be fastened to each other, and the wing unit 400 may thereby be fixed to the support unit 300.

The wing frame portion 440 may be provided between the first skeleton portion 410 and the second skeleton portion 420. The wing fitting member 430 may be configured at a position corresponding to one end of the wing frame portion 440 in the longitudinal direction. As shown in FIG. 1, two wing frame portions 440 may be provided between the first skeleton portion 410 and the second skeleton portion 420 positioned above the plate part 330. Furthermore, the wing frame portion 440 may be positioned between the first skeleton portion 410 and the second skeleton portion 420 and may be configured to allow the loads applied to the first skeleton portion 410 and the second skeleton portion 420 to be transferred to each other.

The skin portion 450 may be configured to surround the outer sides of the first skeleton portion 410 and the second skeleton portion 420. In this case, the skin portion 450 may be positioned in contact with the upper surfaces of the first skeleton portion 410 and the second skeleton portion 420. In this way, the skin portion 450 positioned in contact with the first skeleton portion 410 and the second skeleton portion 420 may be configured to allow the loads applied to the first skeleton portion 410 and the second skeleton portion 420 to be distributed in the longitudinal or width direction of the wing unit 400. The load in the longitudinal direction of the fuselage may be configured to be distributed to the wing unit 400 through the front unit 100 and then via the support unit 300.

Figure 4:
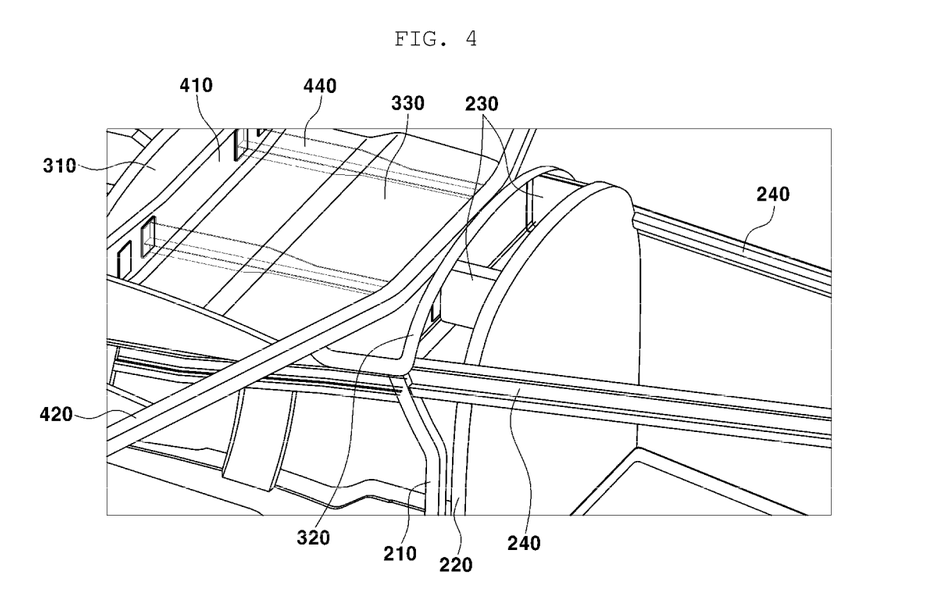
FIG. 4 is a view showing a connection relationship between a wing unit and a rear unit for the collision load distribution structure of a fuselage according to the example of the present disclosure.

FIG. 3 is a view showing a rear unit for the collision load distribution structure of a fuselage according to the example of the present disclosure, and FIG. 4 is a view showing a connection relationship between a wing unit and a rear unit for the collision load distribution structure of a fuselage according to the example of the present disclosure.

With reference to FIGS. 3 and 4, the rear unit 200 may be positioned at the rear end (e.g., to the rear of) the wing unit 400 as a reference. The rear unit 200 may include a first rear frame 210, a second rear frame 220, a rear center frame 230, and a rear side frame 240. The first rear frame 210 may be configured to be connected to the plate portion 330. Here, the first rear frame 210 may extend in a height direction along the outer side of the fuselage and may be fastened to a lower end of the second flange portion 320 from the fuselage floor 130a. In one example, the upper end of the first rear frame 210 may be positioned in contact with the lower end of the second flange portion 320.

The second rear frame 220 may be positioned at the rear end of the first rear frame 210. In this case, the second rear frame 220 may be provided in a plate shape adjacent to the rear end of the first rear frame 210. The second rear frame 220 may be fastened to a pair of connection frames 132a and 132b connected to the rear bulkhead 132. In addition, with an upper end of the first rear frame 210 as a reference, the second rear frame 220 may be positioned to have a predetermined distance to the rear of the first rear frame 210. More specifically, the predetermined distance may be a distance corresponding to a length of the rear center frame 230 of FIG. 4. The first rear frame and second rear frame may be configured to allow the loads coming from the lower end of the fuselage to be transferred to the upper end of the fuselage along the height direction.

The rear center frame 230 may be positioned between the second flange portion 320 and the second rear frame 220. In this case, the rear center frame 230 may be positioned between the space where the second flange portion 320 and the second rear frame 220 face each other. In one example, two rear center frames 230 may be provided at positions corresponding to the positions of the wing frame portions 440 (e.g., to line up with the wing frame portions 440 in the longitudinal direction).

The rear side frame 240 may be positioned in contact with the first rear frame 210 and the second rear frame 220. In this case, the rear side frame 240 may be connected to an upper end of the first rear frame 210 and an upper end of the second rear frame 220. The rear side frame 240 may be provided extending rearward along the longitudinal direction of the fuselage. In this case, one end of the rear side frame 240 may be connected to the first rear frame, and an opposite end of the rear side frame 240 may extend toward the rear of the fuselage.

Figure 5:
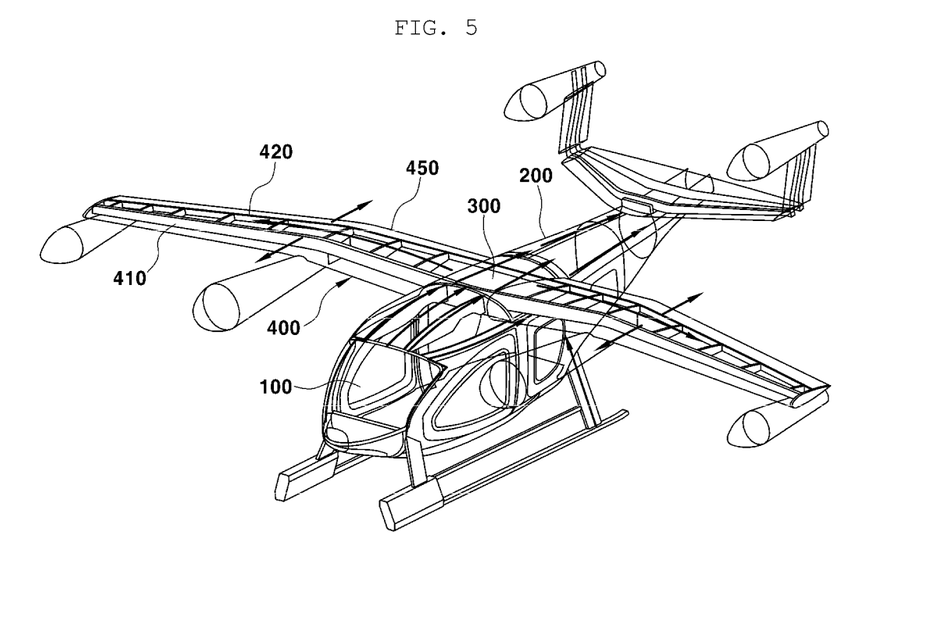
FIG. 5 is a view showing that the load in a longitudinal direction and a load in a height direction for the collision load distribution structure of a fuselage according to the example of the present disclosure are distributed to the rear of the wing unit and the fuselage.

FIG. 5 is a view showing arrows indicating how a load in a longitudinal direction and a load in a height direction are distributed to the rear of the wing unit and the fuselage in the collision load distribution structure of a fuselage according to the present disclosure.

Figure 6:
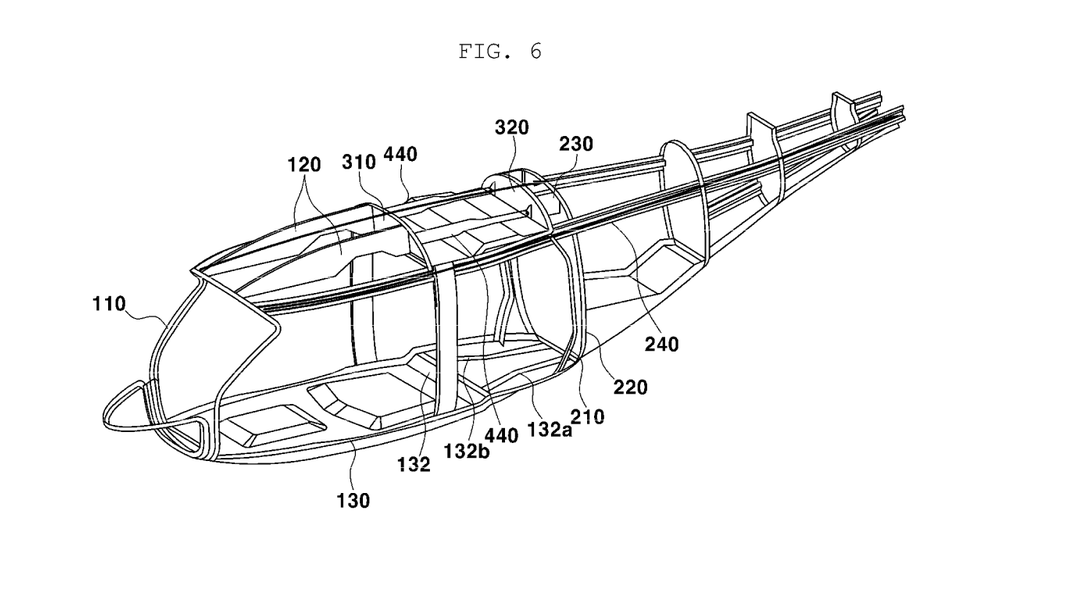
FIG. 6 is a view showing transfer of a center load and a side load in the longitudinal direction for the collision load distribution structure of a fuselage according to the example of the present disclosure.

With reference to FIGS. 5-6, the load in the longitudinal direction of the fuselage is transferred to the first flange portion 310 through the window frame 110 and the roof frame 120, is subsequently transferred to the first skeleton portion 410 (e.g., through the support fitting member 340 and the wing fitting member 430 as shown in FIG. 2), and may be distributed through the skin portion 450. In addition, the load transferred to the first skeleton portion 410 may be transferred to the second skeleton portion 420 through the wing frame portion 440 and distributed through the skin portion 450.

In one example, when a fuselage crashes so that a collision load is applied at an angle with the front end of the fuselage, the load in the longitudinal direction enters the window frame 110 and may be transferred to the front end of the roof frame 120 connected to the rear end of the window frame 110. Subsequently, the load transferred to the rear end of the roof frame 120 may be transferred to the first flange portion 310 and consecutively transferred to the support fitting member 340 and the wing fitting members 430. The load transferred to the support fitting member 340 and the wing fitting member 430 may be transferred to the first skeleton portion 410 and distributed in the longitudinal direction of the first skeleton portion 410. The load distributed in the longitudinal direction of the first skeleton portion 410 may also be distributed in the longitudinal direction of the fuselage through the skin portion 450. In addition, the load transferred to the first skeleton portion 410 may be transferred to the second skeleton portion 420 through the wing frame portion 440 and distributed in the longitudinal direction of the second skeleton portion 420. The load distributed in the longitudinal direction of the second skeleton portion 420 may also be distributed in the longitudinal direction of the fuselage through the skin portion 450.

Meanwhile, the structure may be configured so that a load may be transferred in the height direction of the fuselage to the second flange portion 320 through the first rear frame 210, transferred to the rear side frame 240 and the rear center frame 230 of the rear unit 200 through the second rear frame 220, subsequently transferred to the second skeleton portion 420 via the support fitting member 340 and the wing fitting member 430, and distributed through the skin portion 450. In addition, the structure may be configured so that a load transferred to the second skeleton portion 420 is transferred to the first skeleton portion 410 through the wing frame portion 440, so as to be distributed through the entire area of the fuselage.

In one example, when a collision load in the height direction of the fuselage is applied, the load in the height direction transferred to the fuselage may enter the lower end of the first rear frame 210 and be transferred to the second flange portion 320 connected to the upper end of the first rear frame 210. In addition, a part of the load in the height direction applied to the fuselage may enter a lower end of the second rear frame 220 and be transferred to the rear side frame 240 connected to the upper end of the second rear frame 220. The collision load applied to the second rear frame 220 may be transferred to the second flange portion 320 and transferred to the wing fitting member 430 through the support fitting member 340 fastened to the second flange portion 320. The load transferred to the support fitting member 340 and the wing fitting member 430 may be transferred to the second skeleton portion 420 and distributed in the longitudinal direction of the second skeleton portion 420. The load distributed in the longitudinal direction of the second skeleton portion 420 may also be distributed in the longitudinal direction of the fuselage through the skin portion 450. In addition, the load transferred to the second skeleton portion 420 may be transferred to the first skeleton portion 410 through the wing frame portion 440 and may be distributed in the longitudinal direction of the first skeleton portion 410. The load distributed in the longitudinal direction of the first skeleton portion 410 may also be distributed in the longitudinal direction of the fuselage through the skin portion 450. Through this, the load applied in the height direction of the fuselage may be distributed to the wing unit 400 through the rear unit 200 and then via the support unit 300. FIG. 6 is a view showing transfer of a center load and a side load in the longitudinal direction for the collision load distribution structure of a fuselage according to the present disclosure.

With reference to FIG. 6, the load applied along the longitudinal direction of the fuselage may be transferred through the first flange portion 310 from the roof frame 120 to the wing frame 440 and transferred through the second flange portion 320 from the wing frame portion 440 to the rear center frame 230. In addition, side loads in the longitudinal direction of the fuselage may be transferred through the first rear frame 210 along the sides of the plate portion 330 from opposite ends of the front side, the roof frame 120, to the rear side frames 240.

More specifically, the load is transferred from the front end to the rear end of the roof frame 120 and may be transferred to the support fitting member 340 and the wing fitting member 430 adjacent to the first flange portion 310 through the first flange portion 310. Subsequently, the load transferred to the support fitting member 340 and the wing fitting member 430 adjacent to the first flange portion 310 may be transferred to the wing frame portion 440 and again to the support fitting member and the wing fitting member 430 adjacent to the second flange portion 320. The load transferred to the support fitting member 340 and the wing fitting member 430 adjacent to the second flange portion 320 may be transferred to the second flange portion 320 and subsequently to the rear center frame 230.

In addition, the load transferred to side surfaces out of the loads in the longitudinal direction of the fuselage may be transferred from the front end to the rear end of the fuselage along opposite side ends of the roof frames 120 and may be transferred to the rear surface of the fuselage along the longitudinal direction of the plate portion 330. The load transferred to the rear end of the plate portion 330 may be transferred to the rear side frame 240 via the first rear frame 210.

In summary, the present disclosure provides the collision load distribution structure of a fuselage capable of securing safety such that the crash load entering the fuselage side is transferred and distributed to the wing unit 400 and the rear side of the fuselage by applying the support unit 300 so as to reduce the collision load entering the space where the occupant is positioned.

It should be noted that, while the above discussion provides examples of directionality of load transference, the reverse directionality could also occur in opposite directions to any of the directions mentioned above, e.g., for loads applied at different points of the fuselage, and that the above discussion is nonlimiting to the disclosed structure and how a load would transfer throughout the disclosed collision load distribution structure of the fuselage.

Figure 7:
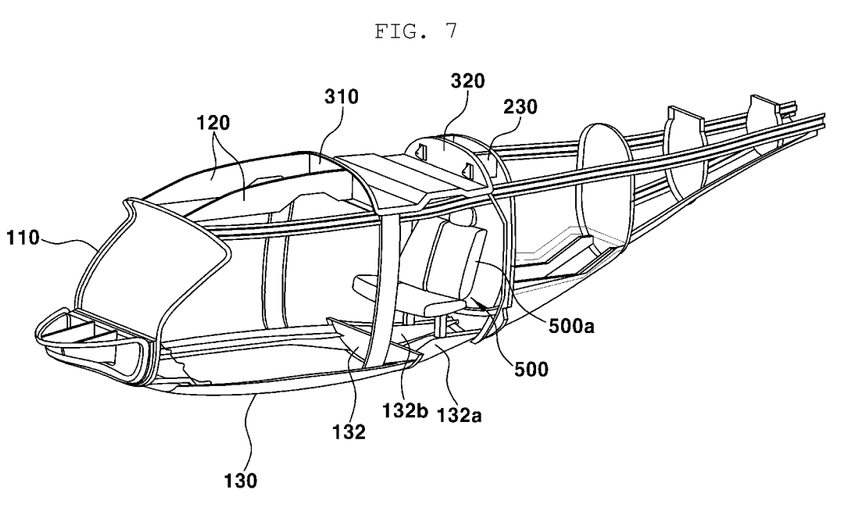
FIG. 7 is a view showing a seat unit for the collision load distribution structure of a fuselage according to the example of the present disclosure.
Figure 8:
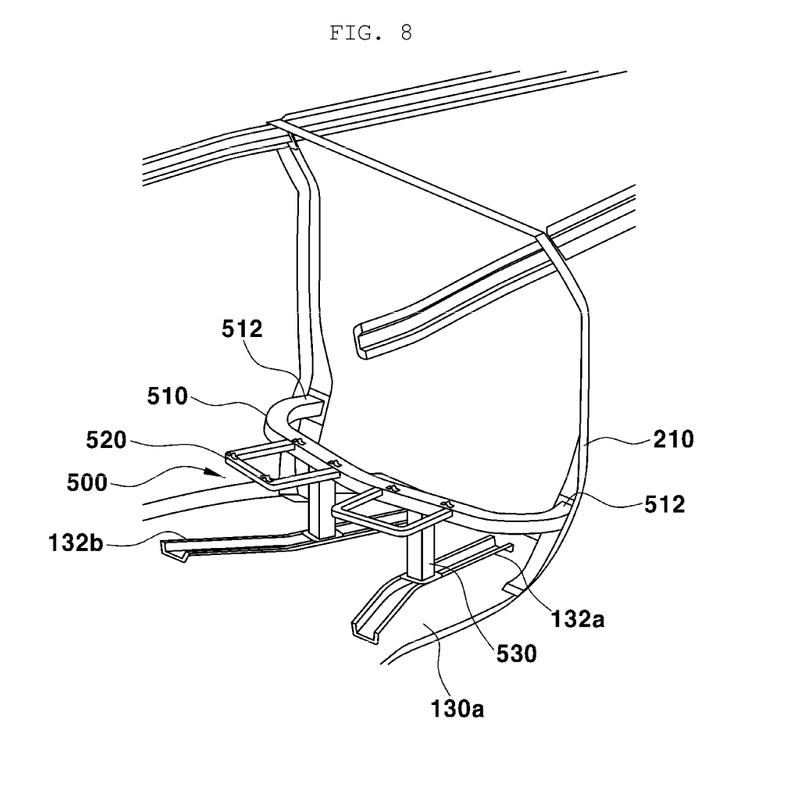
FIG. 8 is a view showing a coupling state of the seat unit for the collision load distribution structure of a fuselage according to an example of the present disclosure.

FIG. 7 is a view showing a seat unit for the collision load distribution structure of a fuselage according to the present disclosure, and FIG. 8 is a view showing a coupling state of the seat unit for the collision load distribution structure of a fuselage according to an example of the present disclosure.

Figure 9:
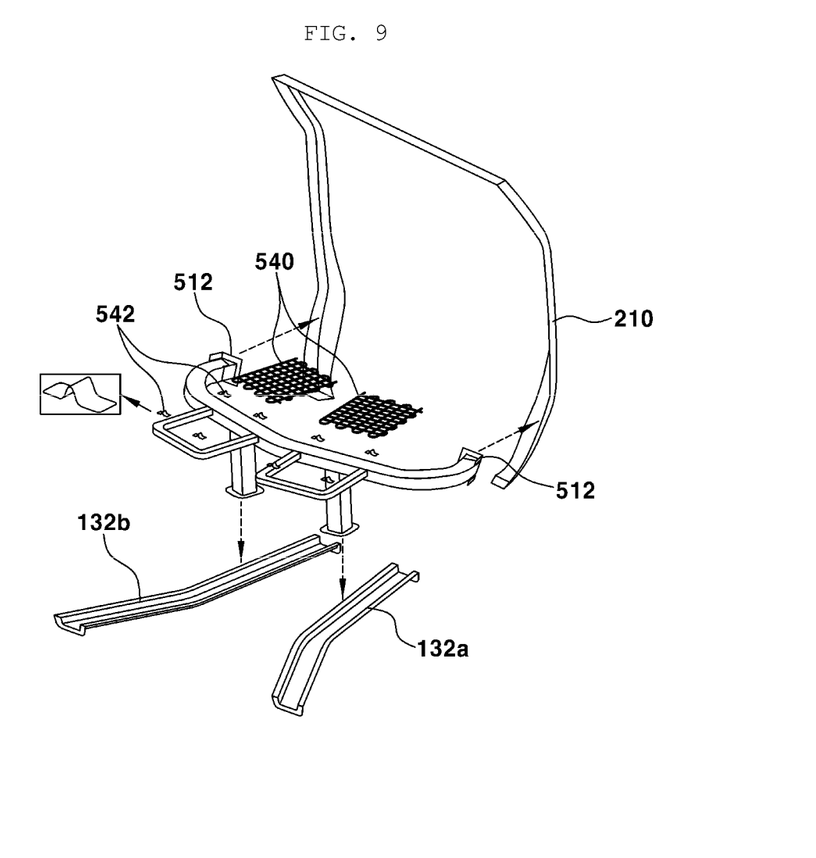
FIG. 9 is a view showing a separated state of the seat unit for the collision load distribution structure of a fuselage according to the example of the present disclosure.
Figure 10:
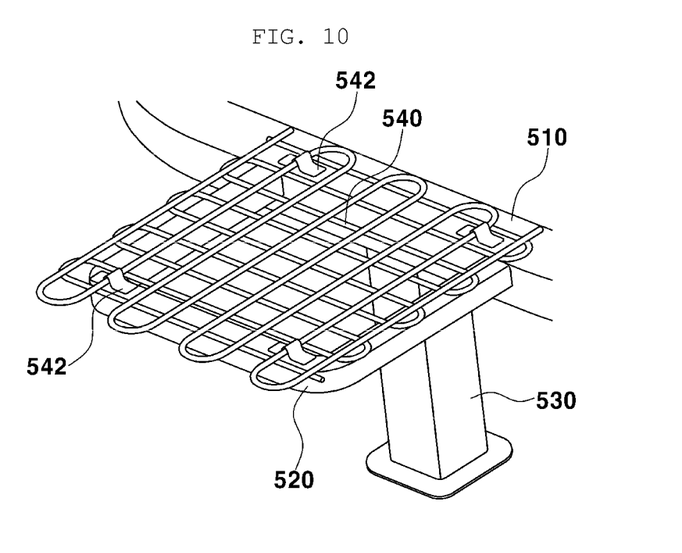
FIG. 10 is a view showing the mounting of a cushion frame member for the collision load distribution structure of a fuselage according to the example of the present disclosure.

In addition, FIG. 9 is a view showing a separated state of a seat unit for the collision load distribution structure of a fuselage according to the present disclosure, and FIG. 10 is a view showing the mounting of a cushion frame member for the collision load distribution structure of a fuselage according to the present disclosure.

With reference to FIG. 9, a seat unit 500 may support the load of the occupant and be coupled to the first rear frame 210 and the connection frames 132a and 132b, thereby improving the transverse rigidity and vertical support rigidity of the fuselage.

That is, as shown in FIG. 7, the seat unit 500 is coupled to the connection frames 132a and 132b mounted in the second-row passenger space of the floor frame 130, which constitutes the fuselage floor 130a of the front unit 100 and. The seat unit may be fastened to the first rear frame 210, which extends in the height direction toward the support unit 300 from the floor frame 130.

As shown in FIGS. 8 and 9, the seat unit 500 may include a seat cross member 510, a cushion support member 520, and a seat support member 530.

The seat cross member 510 may connect opposite sides of the first rear frame 210, which may extend from the floor frame 130 in the second-row passenger space in a state of having an open lower part (e.g., may have two opposite sides that each extend from two separated positions on the floor frame 130). The seat cross member may allow a seat cushion 500a, which is for allowing the occupant to be seated, to be seated thereon.

As described above, the seat cross member 510 may serve not only to provide a support for the seat cushion 500a, but also, by connecting the opposite sides of the first rear frame 210 in the state of having an open lower part, to reinforce transverse rigidity of the first rear frame 210.

The seat cross member 510 may be provided with coupling joints 512 for respectively connecting the opposite sides of the first rear frame 210 at opposite ends thereof and fastened to the opposite sides of the first rear frame 210 through the coupling joints 512, thereby allowing the transverse rigidity for the lower part of the fuselage to be improved.

The cushion support members 520 may allow for preventing the seat cushion 500a from sagging. A pair of cushion support members 520 may protrude toward the front of the seat cross member 510, so as to expand the supporting area for the seat cushion 500a, thereby allowing the seating load of the seat cushion 500a to be effectively supported.

With reference to FIG. 9, the seat unit 500 may further include a cushion frame member 540 (e.g., a cushion frame), wherein the cushion frame member 540 may be mounted to shield (e.g., cover and/or fill) the open inner space of the cushion support member 520, and the seating load applied to the seat cushion 500a by the occupant may be distributed to the cushion support member 520, so the rigidity of the seat cushion 500a may be enhanced when the occupant sits on the seat.

Here, as shown in FIG. 10, the cushion frame member 540 may be made of a mesh net structure. The mesh net may be restrained at the inside of the corresponding joint by each of a plurality of cushion support joints 542. The cushion frame 540 may be fixed by being mounted on the seat cross member 510 and the cushion support member 520.

Each of the seat support members 530 may have a predetermined length and/or may extend from the lower part of the seat cross member 510 to one of the connection frames 132a and 132b. A pair of the seat support members 530 may be coupled with a pair of the connection frames 132a and 132b, respectively. As a result, the pair of seat support members 530 may support the seating load of the seat cushion 500a transferred from the seat cross member 510 and the cushion support member 520.

That is, the seat support members 530 transfer the load to the connection frames 132a and 132b, respectively, and support the seating load of the seat cushion 500a, thereby securing front-rear support rigidity for the fuselage floor 130a through the connection frames 132a and 132b and, at the same time, are coupled with the connection frames 132a and 132b, respectively, thereby improving the transverse rigidity between the connection frames 132a and 132b and the vertical support rigidity for the fuselage floor 130a.

Figure 11:
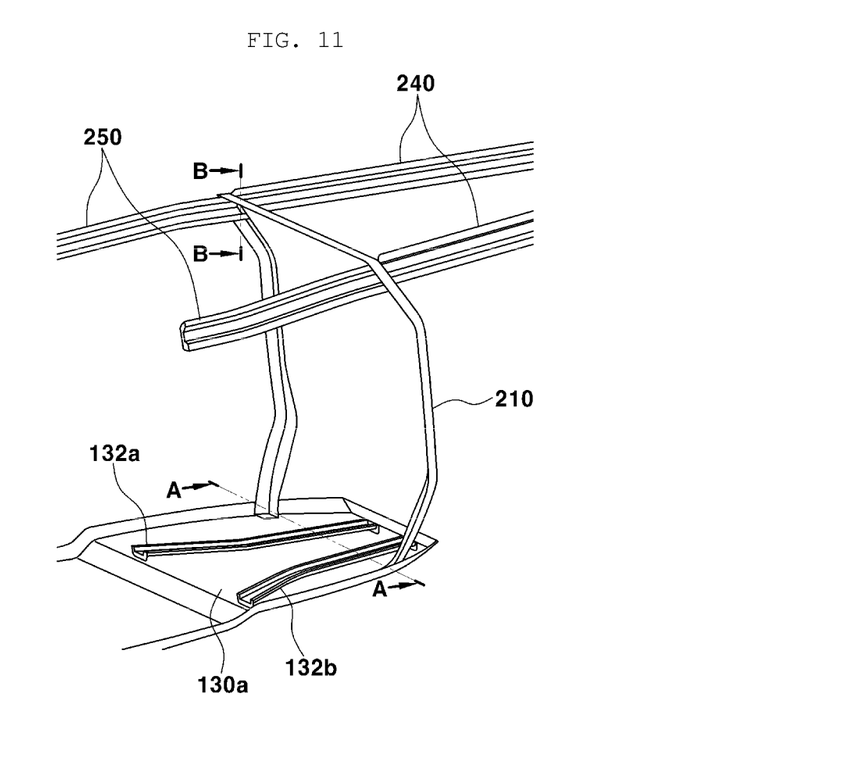
FIG. 11 is a view showing a mounting state of a first rear frame and connection frames for to the collision load distribution structure of a fuselage according to the example of the present disclosure.
Figure 12:
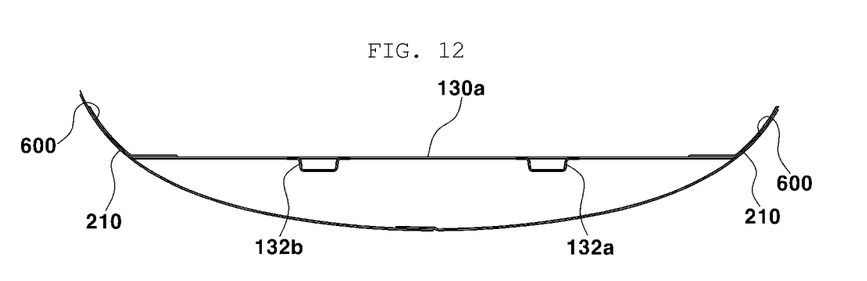
FIG. 12 is a sectional view taken along A-A of FIG. 11 showing a mounting state of a first rear frame and connection frames for the collision load distribution structure of a fuselage according to the example of the present disclosure.
Figure 13:
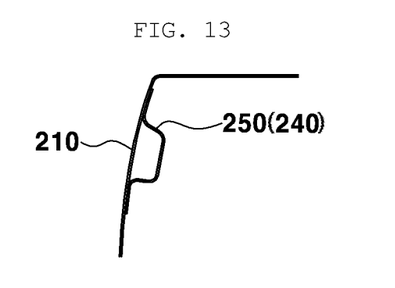
FIG. 13 is a sectional view taken along B-B of FIG. 11 showing a combination of a first rear frame, a front side frame, and a rear side frame for the collision load distribution structure of a fuselage according to the example of the present disclosure.

FIG. 11 is a view showing a mounting state of a first rear frame and a connection frame to the collision load distribution structure of a fuselage according to the present disclosure, FIG. 12 is a sectional view taken along A-A of FIG. 11 showing a mounting state of a first rear frame and a connection frame to the collision load distribution structure of a fuselage according to the present disclosure, and FIG. 13 is a sectional view taken along B-B of FIG. 11 showing a combination of the first rear frame, the front side frame, and the rear side frame for the collision load distribution structure of a fuselage according to the present disclosure.

With reference to FIGS. 11 and 12, each of the connection frames 132a and 132b is drawn into the inside from the bottom part of the second-row passenger space and mounted to be aligned in the same line as an upper surface of the fuselage floor 130a and is provided in a 'c' shape having an open top part so as to allow the seat support member 530 to be inserted into the inside thereof. Accordingly, the coupling of each of the connection frames 132a and 132b to the corresponding seat support member 530 may be made by allowing the seat support member 530 to be inserted into the inside of the corresponding connection frame.

Connection frames 132a and 132b may extend along the fuselage floor frame 130 such that intervals therebetween vary (e.g., a distance between the connection frames 132a/132b may be different at different points along their lengths). The intervals may vary according to a lower part shape of the fuselage floor 130a constituting the second-row passenger space, and through such a structure, reinforcement for the front-rear direction rigidity of the fuselage floor 130a may be made.

Along with this, as shown in FIG. 12, the first rear frames 210 may be spaced apart such that opposite sides of the first rear frames 210 each have an open bottom part (e.g., a 'c' shape). The first rear frames 210 may be provided to correspond to (e.g., to connect with the fuselage floor frame 130 at positions corresponding to) a width of the fuselage floor 130a. The first rear part 210 may be coupled to the fuselage floor 130a so as to come into contact with opposite sides of the fuselage floor 130a in the width direction. On the other hand, a side surface of each side of the first rear frames 210 may be provided in a curved shape and coupled to come into contact with the fuselage skin portion 600 configured to surround the outer side of the fuselage. Accordingly, the first rear frames 210 may allow reinforcement of the fuselage floor 130a to be made.

In summary, the reinforcement of the front-rear direction rigidity of the fuselage floor 130a is made through the connection frames 132a and 132b, and the reinforcement of the transverse direction rigidity of the fuselage floor 130a is made through the first rear frames 210. In such a structure, the seat unit 500, more specifically the seat cross member 510, is fastened to opposite sides of the first rear frame 210, and at the same time, a pair of seat support members 530 is coupled to the connection frames 132a and 132b, respectively, whereby up-down direction support rigidity along with the front-rear direction rigidity and transverse direction rigidity with respect to the fuselage floor 130a may all be improved.

In addition, as the first rear frame 210 is coupled between the front side frame 250 and the rear side frame 240 provided to extend forward and rearward along the longitudinal direction of the fuselage, respectively, an upper position of the first rear frame 210 may be fixed.

In this case, with reference to FIG. 13, the front side frame 250 and the rear side frame 240 may be put in flange coupling with a front and a rear of the first rear frame 210, respectively, at an upper part of the first rear frame 210, so that an upper edge of the first rear frame 210 is supported by the front side frame 250 and the rear side frame 240. Accordingly, not only the rigidity reinforcement of the lower part of the first rear frame 210 and fuselage floor 130a but also the rigidity reinforcement of the upper part of the first rear frame 210 may be made.

The present disclosure has an effect in such a way that the first rear frame extended in the height direction of the fuselage is supported through a front side frame and a rear side frame, and a lower part of the first rear frame is coupled to the fuselage floor, thereby allowing rigidity of the fuselage in the left-right directions to be reinforced, while by being coupled to the first rear frame, a seat unit supports a load of an occupant and allows rigidity to be reinforced, thereby securing transverse rigidity and up-down vertical rigidity of the fuselage by utilizing a seat unit structure.

Accordingly, the present disclosure may be configured to reduce the collision load from being transferred to the occupant's space in case of an inclined crash of the fuselage, so there is an effect of securing the occupant's safety.

The present disclosure has been made keeping in mind the above problems, and the present disclosure is intended to provide a collision load distribution structure of a fuselage in such a way that the first rear frame extended in the height direction of the fuselage is supported through a front side frame and a rear side frame, and a lower part of the first rear frame is coupled to the fuselage floor, thereby allowing rigidity of the fuselage in the left-right directions to be reinforced, while by being coupled to the first rear frame, and connection frames for reinforcing rigidity of the fuselage in the front-rear directions, a seat unit supports a load of an occupant and, at the same time, allows rigidity of the up-down directions to be reinforced, thereby securing transverse rigidity and up-down vertical rigidity of the fuselage by utilizing a seat unit structure.

In order to achieve the above objective, according to one aspect of the present disclosure, there may be provided a collision load distribution structure of a fuselage, the structure including: a support unit positioned between a front unit and a rear unit of the fuselage and configured to allow a collision load of the fuselage to be transferred by being connected to the front unit and the rear unit; a wing unit positioned at the inside of the support unit and connected to the support unit to transfer the collision load of the fuselage; and a seat unit coupled to connection frames mounted in a second-row passenger space of a floor frame constituting the front unit and fastened to a first rear frame extending in a height direction from the floor frame toward the support unit.

Here, the seat unit may include: a seat cross member configured to connect opposite sides of the first rear frame erected on the floor frame in a state of having an open lower part and to allow a seat cushion to be seated thereon; a plurality of cushion support members configured to protrude toward the front of the seat cross member and to support the seat cushion; and a plurality of seat support members each of which extends from a lower part of the seat cross member to corresponding one of the connection frames and is coupled to the corresponding one of the connection frames and supports a seating load of the seat cushion transferred from the seat cross member and the cushion support member.

Such a seat unit may further include a cushion frame member mounted to shield an open inner space of the cushion support member and configured to distribute the seating load of the seat cushion to the cushion support member.

The cushion frame member may be made of a mesh net structure and is mounted on and fixed to the seat cross member and the cushion support member by a plurality of cushion support joints. In addition, the seat cross member may be provided with coupling joints for respectively connecting the opposite sides of the first rear frame at opposite ends thereof and fastened to the opposite sides of the first rear frame through the coupling joints.

In addition, each of the connection frames may be drawn into and mounted on the floor frame and may be configured in a "c" shape, thereby allowing the seat support member to be inserted into and coupled to the inside thereof.

In addition, the connection frames may include a pair of connection frames that may be respectively extended in such a way that intervals therebetween are to be varied according to a lower part shape of the second-row passenger space.

Here, the first rear frame may have an upper position fixed by flange coupling with a front side frame and a rear side frame configured to extend forward and rearward along a longitudinal direction of the fuselage, respectively.

In addition, as the first rear frame is coupled to come into contact with a fuselage skin portion configured to surround the outside of the fuselage, opposite side positions of the first rear frame may be fixed.

Meanwhile, according to one aspect of the present disclosure, there may be provided a collision load distribution structure of a fuselage, the structure including: a support unit positioned between a front unit and a rear unit of the fuselage and configured to allow a collision load of the fuselage to be transferred by being connected to the front unit and the rear unit; a wing unit positioned at the inside of the support unit and connected to the support unit to transfer the collision load of the fuselage; and a seat unit coupled to connection frames mounted in a second-row passenger space of a floor frame constituting the front unit and fastened to a first rear frame extending in a height direction from the floor frame toward the support unit, wherein the seat unit may be connected to the first rear frame in a horizontal direction and coupled to the connection frame in a vertical direction, thereby allowing transverse rigidity and up-down rigidity of the fuselage to be reinforced.

As described above, the present disclosure has an effect in such a way that the first rear frame extended in the height direction of the fuselage is supported through a front side frame and a rear side frame, and a lower part of the first rear frame is coupled to the fuselage floor, thereby allowing rigidity of the fuselage in the left-right directions to be reinforced, while by being coupled to the first rear frame, a seat unit supports a load of an occupant and allows rigidity to be reinforced, thereby securing transverse rigidity and up-down vertical rigidity of the fuselage by utilizing a seat unit structure.

Accordingly, the present disclosure can be configured to reduce the collision load from being transferred to the occupant's space in case of an inclined crash of the fuselage, so there is an effect of securing the occupant's safety.

The present disclosure has been described above with reference to the examples shown in the drawings, but this is only exemplary, and those skilled in the art will understand that various modifications may be made therefrom, and that all or parts of the above-described examples may be selectively combined and configured. Therefore, the true technical protection scope of the present disclosure should be defined by the technical spirit of the appended claims.

What is claimed is:

1. An aircraft collision load distribution structure comprising:
   a support unit positioned between a front unit and a rear unit of a fuselage and configured to allow a collision load of the fuselage to be transferred via connections to the front unit and the rear unit, wherein the front unit comprises a floor frame;
   a wing unit positioned at an inner side of the support unit and connected to the support unit so as to be configured to allow the collision load of the fuselage to be transferred;
   a first rear frame, the first rear frame comprising a left portion and a right portion, wherein the left and right portions each extends in a height direction from the floor frame so as to transfer loads from a lower part of the fuselage to an upper part of the fuselage; wherein an upper portion of the first rear frame is connected to the support unit; and
   a seat unit that is configured to reinforce transverse rigidity and vertical rigidity of the fuselage, the seat unit comprising:
      a seat cross member connected to and extending between the left portion and the right portion of the first rear frame;
      at least one cushion support member protruding from the seat cross member and configured to support a seat cushion; and
      a pair of seat support members each extending from a lower part of the seat cross member to a corresponding connection frame, of a pair of connection frames, that is mounted in the floor frame, wherein the seat support members are configured to support a seating load applied to the seat cushion and transferred from the seat cross member and the cushion support member.

2. The aircraft collision load distribution structure of claim 1, wherein the seat unit further comprises a cushion frame mounted so as to cover an open inner space of the at least one cushion support member, wherein the cushion frame is configured to distribute the seating load of the seat cushion to the at least one cushion support member.

3. The aircraft collision load distribution structure of claim 2, wherein the cushion frame comprises a mesh net structure and is mounted on and fixed to the seat cross member and the at least one cushion support member by a plurality of cushion support joints.

4. The aircraft collision load distribution structure of claim 1, wherein the seat cross member comprises coupling joints for respectively connecting the left and right portions of the first rear frame at opposite ends thereof, and wherein the seat cross member is fastened to the left and right portions of the first rear frame via the coupling joints.

5. The aircraft collision load distribution structure of claim 1, wherein each of the connection frames is: inserted into and mounted on the floor frame, and configured in a c shape, thereby configured to allow the seat support members to be inserted into and coupled to an inside of the connection frame.

6. The aircraft collision load distribution structure of claim 1, wherein the pair of connection frames are mounted in a second row passenger space of the floor frame, and the connection frames extend such that a distance between the connection frames varies according to a lower part shape of a second-row passenger space of the floor frame.

7. The aircraft collision load distribution structure of claim 1, wherein the upper portion of the first rear frame is fixed by flange coupling to a front side frame and a rear side frame, wherein the front side frame extends forward along a longitudinal direction of the fuselage and the rear side frame extends rearward along the longitudinal direction of the fuselage.

8. The aircraft collision load distribution structure of claim 1, wherein the first rear frame is in contact with a fuselage skin portion configured to surround an outside of the fuselage such that opposite side positions of the first rear frame are fixed.

* * * * *